April 30, 1963     T. N. BUSCH     3,087,246

DETERMINING REFERENCE PLANE FOR SURFACE PLATE INSPECTION

Filed Sept. 15, 1960     3 Sheets-Sheet 1

Theodore N. Busch

April 30, 1963 T. N. BUSCH 3,087,246
DETERMINING REFERENCE PLANE FOR SURFACE PLATE INSPECTION
Filed Sept. 15, 1960 3 Sheets-Sheet 2

Theodore N. Busch

April 30, 1963 T. N. BUSCH 3,087,246
DETERMINING REFERENCE PLANE FOR SURFACE PLATE INSPECTION
Filed Sept. 15, 1960 3 Sheets-Sheet 3

Theodore N. Busch
By
Attorney

_United States Patent Office_ 3,087,246
Patented Apr. 30, 1963

3,087,246
DETERMINING REFERENCE PLANE FOR SURFACE PLATE INSPECTION
Theodore N. Busch, Savage, Minn., assignor, by mesne assignments, to The DoAll Company, Des Plaines, Ill., a corporation of Illinois
Filed Sept. 15, 1960, Ser. No. 56,316
9 Claims. (Cl. 33—1)

This invention relates to a method and means for inspecting the gaging surface of a surface plate by means of a calibrated straightedge, to obtain a quantitative appraisal of the deviation of said surface from true flatness at selected points thereon; and the invention refers more particularly to a method and means for readily selecting and using a reference plane to which elevation values for all measured points on the surface can be related.

In many types of precision gaging work it is necessary to employ a surface plate having a reference surface which is flat to within a very few millionths of an inch. Since it is known that wear and aging can affect the flatness of the gaging surface of a surface plate, such a plate should be inspected from time to time to check the amount of its departure from true flatness at various points on its surface. With a record of the amount and direction of such deviations, corrections can be applied to readings made from the surface plate in order to insure a high degree of gaging accuracy. Obviously, such periodic checking also reveals whether the surface plate is within tolerance limits or is so far out of tolerance as to need refinishing.

Inspection of the gaging surface of a surface plate can be accomplished by mounting a calibrated straightedge on footblocks which rest upon the surface being inspected, and taking measurements, at predetermined intervals along the straightedge, of the distance between the reference surface and the straightedge. In order to insure a systematic spot check of the entire surface, or so much thereof as is to be inspected, measurements are taken along each of the opposite diagonals of the surface plate (which is usually square or rectangular), and then along each of a series of grid lines which extend parallel to the side edges of the surface plate.

Because the straight edge is always in effect supported by the surface to be checked, the distances between the surface and the straightedge, taken along any one line of measurements, cannot be directly compared with those taken along another line of measurements. Instead, all of the measurements must be related to an imaginary reference plane which lies on or near the surface of the plate, and it is the distances from this reference plane to the plate surfaces which have significance, since such distances are directly comparable with one another as values of the relative elevations of the several points on the surface to which measurements have been made. The reference plane used in surface plate inspection thus performs the same function, in relating the elevations of points on the surface plate to one another, as is performed by the concept of mean sea level in the measurement of land elevations.

Heretofore the equipment used in checking a surface plate has included a footblock which was adjustable as to height, and which cooperated with a fixed footblock in supporting a calibrated straightedge above the surface of the plate to be inspected. Height adjustability for at least one of the footblocks was necessary to facilitate the heretofore conventional practice of "balancing" the ends of the straightedge each time it was set up along one of the diagonals, that is, bringing the end portions of the straightedge to equal distances above the plate surface. To do this, a dial gage or electrical comparator was used to take measurements of the distance from the straightedge to the plate surface at points adjacent to each footblock and adjustments were made to the adjustable footblock until these two distances were equal.

It might be mentioned at this point that accuracy of the footblock adjustment depended upon the dexterity of the operator and the skill and accuracy with which readings were taken and interpreted. Moreover, an adjustable footblock could not be absolutely depended upon to hold its adjustment all during the period of time required for taking readings along a line of measurements across the surface of a plate. Consequently the use of an adjustable footblock was attended by many inaccuracies, which all too often went undetected. It is also to be noted that the surface elevations of the points on which the footblocks rested were not necessarily the same as the elevations of the nearby points to which the measurements were made.

After the straightedge had been set up along one of the diagonals across the plate surface, and its ends had been "balanced" by adjustment of the adjustable footblock, the gage or comparator was moved to the midpoint on the straightedge and set to zero. Thereafter, the gage or comparator was used to take readings, at designated stations along the straightedge, of the distance between the surface and the straightedge. The deviation of the straightedge from straightness at each of the stations was known from its calibration, and the readings obtained at the several stations were corrected for the calibrated deviation values and were tabulated.

This entire measurement process, including "balancing" of the ends of the straightedge and zeroing of the gage or comparator, was then repeated on the second diagonal. Because the gage had been zeroed at the midpoints of the two lines of measurements—i.e. at the intersection of the two diagonals—the corrected measurements taken along the two diagonals defined a pair of lines which intersected one another on the surface of the plate. These intersecting lines, of course, defined a plane, and the plane thus defined was taken as the reference plane to which all elevations on the surface of the plate were related.

When the reference plane had been established in this manner, lines of measurements were taken along grid lines that paralleled a side edge of the plate. With the straightedge set up on a grid line, the adjustable footblock and the gage were adpusted until the readings at the intersections of the diagonals with that grid line, compensated for the known deviations of the straightedge, corresponded to the corrected readings found for the same points when measuring along the diagonals. The straightedge was then assumed to be on the reference plane, or, more correctly, on a plane exactly parallel to the reference plane. Direct measurements were then taken from the straightedge to the plate surface, and such readings, compensated for the calibrated straightedge deviation, were then tabulated.

The process of setting up the straightedge and adjusting the adjustable footblock to dispose the straightedge on (or parallel to) the reference plane, taking measurements between the straightedge and the surface, and tabulating the measured values, was repeated for each grid line along which measurements were to be taken, until so much of the plate had been checked as was believed to provide a satisfactory indication of its surface contours.

It is to be observed that the reference plane obtained by this prior art procedure was at equal distances from the surface at the opposite ends of each diagonal (due to the "balancing" of the ends of the straightedge prior to taking measurements along each diagonal), and that it invariably touched the surface of the plate at the center of the same. It was assumed that a reference plane arrived at in this manner would provide a satisfactory picture of the surface contours of the plate; but in fact measurements taken to a reference plane thus determined could prove to be very confusing, and in some instances indicated that a surface plate was out of tolerance when in fact its departures from true flatness were not excessive.

By way of illustration, consider a plate surface having a high spot at one corner, but which is otherwise perfectly flat. A line of measurements taken from a "balanced" straightedge along a diagonal through the high corner would show varying values all along the length of the diagonal, and the tabulated values of these measurements could be interpreted to mean that the plate was high at both corners through which the diagonal extended, or that it was low at its center. Measurements to such a plate from a reference plane selected by the procedure heretofore conventional would have to be studied very carefully before they provided a clue to the fact that most of the plate was actually flat. On the other hand, if a reference plane had been selected which lay on or parallel to the major portion of the surface area, the tabulated values of the elevations relative to this plane would have revealed at once the true nature of the local inaccuracy in the plate surface.

The present invention is in part based upon a recognition that a reference plane is always, in fact, selected arbitrarily from among an infinite number of possible imaginary planes to which measurements may be related; and with this in mind it is an important object of this invention to provide a method and means for facilitating the selection, from among these possibilities, of a reference plane which offers the best promise of portraying the surface contours of a surface plate in a useful and revealing manner, to best disclose the true nature of the plate's deviations from flatness. The reference plane for a particular plate which best meets these requirements is hereinafter sometimes referred to as the practical gaging reference plane for that plate.

It is thus a general object of this invention to provide a method of determining a reference plane for surface plate checking, whereby the operator is enabled to exercise a wide scope of judgment and choice in the selection of the reference plane, so that he can readily select a reference plane which will best reveal the surface features that he desires to emphasize, and which may, if desired, be the practical gaging reference plane.

A more specific object of this invention resides in the provision of a novel method for determining a reference plane for use in surface plate inspection, which method lends itself to practice by means of an analogue computer that not only facilitates the selection of a reference plane which best suits the purpose for which the inspection is made, but also facilitates and expedites the tabulation of values of surface elevations of the plate relative to that reference plane.

A further object of this invention resides in the provision of a method for establishing a reference plane for use in the checking of a surface plate surface by means of a straightedge, which method obviates the necessity for using an adjustable footblock and thus eliminates the inaccuracies attendant upon the use of such a footblock, and instead permits readings to be taken from a straightedge mounted upon a pair of fixed footblocks that rest on the surface being checked.

It will be apparent from this that it is another object of this invention to eliminate in the checking of a surface plate by means of a straightedge, the tedious and time consuming operation of "balancing" the distances between the surface plate and the two ends of the straightedge, thus considerably simplifying and expediting the process of taking measurements.

It is thus another object of this invention to provide a simple and expeditious method of determining a reference plane for use in checking a surface plate by means of a straightedge, and of relating measured elevations to said reference plane, which method minimizes the chances for mechanical, observational and arithmetical errors and thereby greatly improves the accuracy of the checking procedure.

Another and very important object of this invention is to provide a simple and inexpensive analogue computer for use in checking a surface plate by means of a straightedge, which computer may be employed to facilitate selection of a practical gaging reference plane and determination of elevation values on the surface of the plate in relation to that reference plane.

It is also an object of this invention to provide a computer of the character described which greatly facilitates the selection of a reference plane for use in the inspection of the surface of a surface plate, and which also permits the facile selection of a new reference plane in the event it is determined that the originally selected reference plane is for some reason not satisfactory, or that an additional reference plane is desirable.

Still another specific object of this invention is to provide a computer which affords a graphic portrayal of the profile of a surface plate surface along a line thereof on which measurements to a straightedge have been made, so that by visual inspection of the profile thus portrayed a reference plane can be selected which provides the most satisfactory depiction of the surface configuration of the plate, and which computer, moreover, enables very rapid determination of the distance from the reference plane to any point on the surface to which a measurement has been made.

It is also a specific object of this invention to provide a computer of the character described which provides for substantially automatic correction of the measurements taken between the surface of a surface plate and the calibrated edge of a straightedge, to compensate for calibrated deviations of the straightedge from true straightness.

From what has been said above, it will be apparent that the objects of this invention include the provision of a computer useful in connection with the calibration of a surface plate, which greatly facilitates selection of a practical gaging reference plane, or any other desired reference plane, improves the accuracy of the entire inspection procedure, and greatly facilitates and expedites such inspection.

With the above and other objects in view, which will appear as the description proceeds, this invention resides in the novel method and device substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof and in which.

Figure 1:
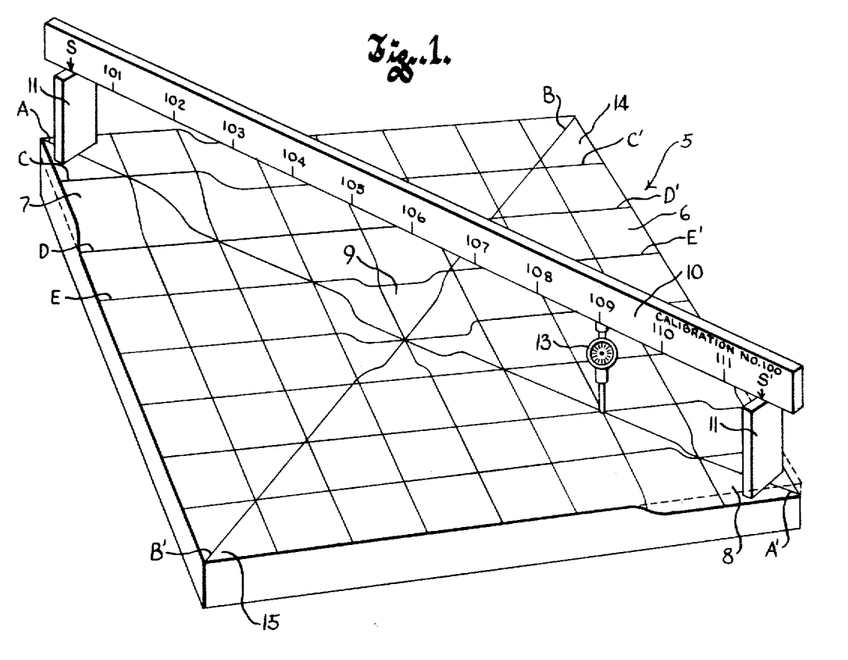
FIGURE 1 is a more or less diagrammatic perspective view of a surface plate upon which a straightedge has been set up for the purpose of taking measurements along one of the diagonals of the plate, the irregularities in the surface of the plate being shown greatly exaggerated for the sake of clarity.

Referring now more particularly to the accompanying drawings, the numeral 5 designates generally a surface plate having a surface 6 which is intended to be accurately flat to within certain specified tolerances in order to be adapted for cooperation with various precision gaging instruments. For purposes of illustration it will be assumed that the surface 6 has certain deviations from true flatness, and specifically that it is high at its upper left hand (northwest) corner 7, low at its southeast corner 8, and has a depression at its center 9. All other portions of the surface are assumed to be flat within the limits to which measurements can be made. Although the discrepancies are illustrated in FIGURE 1 as being of very substantial magnitude, it will be appreciated that this is an exaggeration for the sake of clarity, since in actual practice the value of such deviations would most likely be on the order of a few millionths of an inch and would be undetectable without instruments.

For the purpose of checking the surface plate surface in accordance with the method of this invention, a calibrated straightedge 10 is mounted on a pair of fixed footblocks 11 which are so placed on the surface of the plate as to dispose the straightedge along one of the diagonals A—A′ and B—B′ across the plate, in this case along the diagonal A—A′ extending from the northwest corner 7 to the southeast corner 8. Either diagonal may be used for making the first set of measurements. It will be understood that to facilitate making measurements, the plate surface is marked in the conventional manner with the diagonals and grid lines along which measurements are to be made.

Attention is directed to the fact that neither of the footblocks 11 is adjustable, and that the method of this invention therefore contemplates no height "balancing" of the ends of the straightedge. However, as in the prior practice, it is necessary that the footblocks be accurately located under designated support points S and S′ on the straightedge, in order to insure that the straightedge will be supported in the same way during use as it was during calibration, so that its calibrated deviations from straightness at each of the designated stations 101–111 along its length will be maintained while measurements are taken. It is also necessary that one of the designated stations, preferably the central station 106, be disposed over the other diagonal B—B′.

Preferably, measurements from the straightedge to the surface plate surface are made by means of an electrical comparator, although in this case, for simplicity, a dial gage 13 (illustrated more or less diagrammatically) is shown being used for this purpose. There is no need to zero the indicator of the gage 13, although it may be desirable to make a hasty check at a few points along the length of the straightedge to see that all measurements will fall within the scale of the dial. Thereafter a careful measurement is made, at each of the designated stations 101–111 along the length of the straightedge, of the distance from the straightedge to the surface 6. Since a single such measurement may be inaccurate, it is customary to make several readings at each station and take the mean or average of the several values thus obtained as the value for the station. The usual precautions are taken, of course, to insure that temperature and other conditions which affect gaging accuracy are kept stable.

Figure 2:
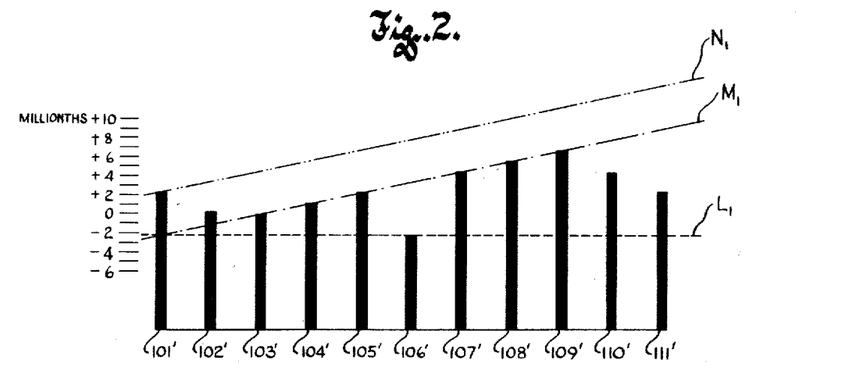
FIGURE 2 is a graph representing the practice of one step in the method of this invention as applied to the checking of the surface plate shown in FIGURE 1.

The "raw" distance measurement reading obtained for each station must be corrected by the value of the calibrated deviation of the straightedge at that station, and the corrected values for the several measurements are then plotted in the form of a graph, as illustrated in FIGURE 2. The horizontal and vertical scales of the graph may be arbitrarily selected, but the vertical scale should of course be very much magnified relative to the horizontal scale, so as to greatly exaggerate the relative elevations along the line of measurements and thus show them clearly. The graph may be in any usual form which satisfactorily reveals the surface profile, being shown in FIGURE 2 as a bar graph in which each bar corresponds to one of the calibrated stations along the length of the straightedge, and is designated by a primed numeral corresponding to the number of the station. The bars are spaced apart by distances proportional to the spacing between designated stations on the straightedge, and the tops of the bars are spaced from an arbitrarily selected zero line by distances corresponding to the corrected values for the distances from the straightedge to the surface 6. Thus the tops of the bars define a profile corresponding to that of the plate surface along the northwest-southeast diagonal A—A′.

On this graph representing the A—A′ profile a straight line is now drawn which extends across all of the calibration stations and which lies in the selected reference plane. It is a feature of this invention that the determination of the location of this straight line is entirely a matter of choice with the operator, and he is thus free to select any of the infinite number of reference planes available to him.

Three of the possible choices are designated by the lines $L_1$, $M_1$, and $N_1$ in FIGURE 2. Line $M_1$ is so chosen as to lie along the major portion of the surface which is seen to be flat, and a reference plane defined by this line obviously affords the possibility of presenting a fair and revealing picture of the true nature of the discrepancies in the surface. Line $M_1$ therefore lies in the practical gaging reference plane. Line $L_1$ corresponds to the first reference plane defining line that would be established by following the prior art procedure. Note that $L_1$ crosses the outer stations 101′ and 111′ at points which are equal distances from the surface, and crosses the center station 106′ exactly at the surface. It will be apparent that a tabulation of the distances from line $L_1$ to the surface at the several stations will present a confusing picture of the profile of this particular surface, suggesting that its deviations from flatness are numerous and quite irregular. Line $N_1$ is another of the many possible selections that could be made, having been drawn through the highest point on the surface (the northwest corner 7) and parallel to the flat area which occupies the major portion of the surface. Line $N_1$ would have value in emphasizing the deviations in the surface.

The values for the distance, at each station, from the selected straight line $L_1$, $M_1$ or $N_1$ to the surface are measured from the graph and tabulated. Preferably the tabulation is recorded on a sketch similar to FIGURE 5, on which the lines of measurement across the surface are indicated for reference purposes. The circled numerals in FIGURE 5 designate distances from the reference plane in millionths of an inch, positive (+) numbers denoting elevations above the reference plane and negative (—) numbers denoting elevations below it.

The next step in the method of this invention is to take measurements from the straightedge to the surface along the diagonal B—B′ which extends from the northeast corner 14 of the plate to the southwest corner 15. The procedure followed in taking and correcting the measurements along the second diagonal B—B′ is identical with that for the first diagonal A—A′. Care should be taken, however, that the straightedge is so located along the length of diagonal B—B′ that one of the designated stations on the straightedge (preferably the center station 106) coincides with the intersection with the first diagonal A—A′.

Figure 3:
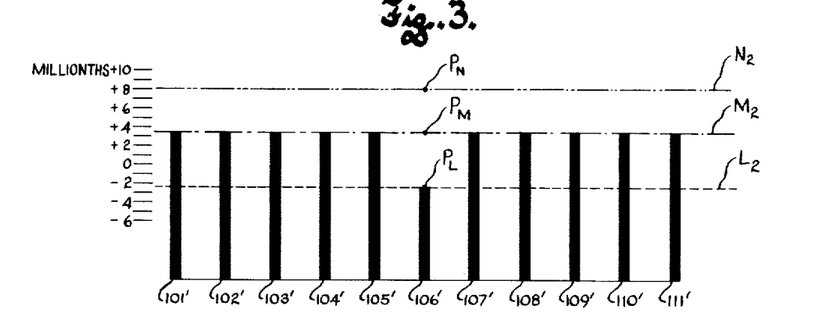
FIGURE 3 is a graph representing another step in the method of this invention as applied to the checking of the plate shown in FIGURE 1.

The corrected values of the distances thus measured along diagonal B—B' are plotted in the form of a graph, as in FIGURE 3, and on this graph there must now be indicated the point which represents the first selected reference-plane-defining line. It is the plotting of this point which makes possible the free choice of a reference plane, and hence this step is of vital importance in the method of this invention. On the first graph (FIGURE 2), at the center station 106', there is read the value of the distance from the reference-plane-defining line ($L_1$, $M_1$ or $N_1$) to the surface. On the graph of the profile along diagonal B—B' (FIGURE 3), at the center station, there is plotted the point ($P_L$, $P_M$ or $P_N$) at the corresponding distance from the surface. Since the center station 106' on the graph FIGURE 3 is common to the diagonals A—A' and B—B', and the point just plotted is on the first reference-plane-defining line at the intersection of the diagonals, any line drawn through said point will intersect the first reference-plane-defining line $L_1$, $M_1$ or $N_1$, and will cooperate therewith to define a reference plane.

In FIGURE 3 there has been drawn one of the many possible lines that could be drawn through each of the three points $P_L$, $P_M$ and $P_N$, respectively, these lines being designated $L_2$, $M_2$ and $N_2$. The line $L_2$, drawn through the point $P_L$ which corresponds to line $L_1$, represents the reference plane that would be derived by following the prior art procedure described above. Note that the center point $P_L$ of line $L_2$ lies on the surface of the plate, and its ends (stations 101' and 111') are at equal distances from the surface, due to the "balancing" of the ends of the straightedge. It is noteworthy that a tabulation of values read from the line $L_2$ to the profile surface will tend to conceal the fact that the central depression in the plate is a local condition and that the major portion of its surface area is flat.

Line $M_2$ in FIGURE 3 is one of the lines that could be drawn through the point $P_M$, to cooperate with line $M_1$ in defining a reference plane. Line $M_2$ was chosen because it lies along the surface of the profile along most of its length, and is thus best calculated to reveal the true nature of the plate surface. Lines $M_1$ and $M_2$ thus define the practical gaging reference plane for this particular plate surface.

Line $M_2$ is one of the lines that could be drawn through the point $P_N$ to cooperate with line $N_1$ in defining a reference plane. It was drawn parallel to the major portion of the profile surface because in that position it emphasizes the discrepancies in the plate without concealing their true nature. Obviously, if line $N_2$ (or lines $L_2$ or $M_2$ for that matter) had been tilted at an oblique angle to the flat surface portion, the resultant reference plane would have depicted the surface contours of the plate in great confusion.

Figure 5:
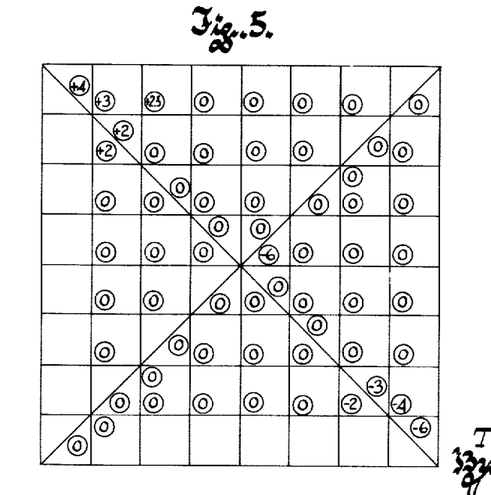
FIGURE 5 is a plot of the several lines of measurements taken across the surface of the plate shown in FIGURE 1 in the course of checking the same, with elevation values for corresponding points on the plate surface tabulated thereon.

Assuming that the practical gaging reference plane defined by the lines $M_1$ and $M_2$ has been selected for checking purposes, the values corresponding to the distance from the line $M_2$ to the profile surface at each station on the graph, FIGURE 3, are now entered on the plot of the surface plate, as in FIGURE 5.

Figure 4:
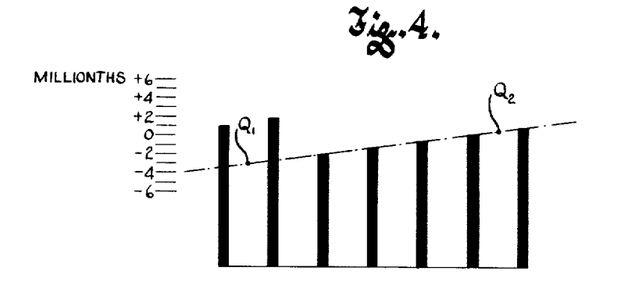
FIGURE 4 is a graph representing the profile of the plate along a line of measurements parallel to an edge of the plate, and showing the relationship of one selected reference plane to the elevations on this profile.

Next, measurements are taken with the straightedge extending along each of a series of grid lines that are parallel to the side edges of the plate, and the corrected values obtained from such measurements are plotted in the form of a graph, such as FIGURE 4, which depicts the profile of the surface 6 as measured along the east-west grid line C—C'. As with the procedure heretofore conventional, it is known that the reference-plane-defining lines $M_1$ and $M_2$ will appear on this profile graph as two points $Q_1$ and $Q_2$ which may be regarded as bench marks. The abscissas of points $Q_1$ and $Q_2$ are defined by the stations nearest the intersections of grid line C—C' with the respective diagonals A—A' and B—B'. The ordinates of points $Q_1$ and $Q_2$ are determined from the graphs, FIGURES 2 and 3, respectively, taking the distances from the surface to the reference plane at the stations nearest the intersections of diagonals A—A' and B—B' with the grid line C—C', interpolating if necessary. Having plotted the points $Q_1$ and $Q_2$, a straight line is drawn through them, corresponding to the reference plane, and the elevation of the surface at each station along grid line C—C', relative to the reference plane can then be taken off of the graph and tabulated on a plot of the surface, as in FIGURE 5.

A similar procedure is followed with respect to measurements taken along other grid lines, such as D—D', E—E', etc., until the inspection of the surface is completed.

On the calibrated straightedge shown in FIGURE 1 the support points S and S' are spaced apart by a distance greater than the width of the surface plate, and it will be understood that either a different straightedge is used for taking measurements along the grid lines or that the same straightedge is used with more closely spaced support points designated thereon, on its opposite side, for example. A separate calibration is of course made for the alternate pair of support points.

It might also be mentioned that the grid lines are preferably spaced apart at such intervals that they fall at the points of measurements along each diagonal, so as to avoid the necessity for interpolating values for stations between those at which measurements have been taken when determining the bench mark points.

Figure 6:
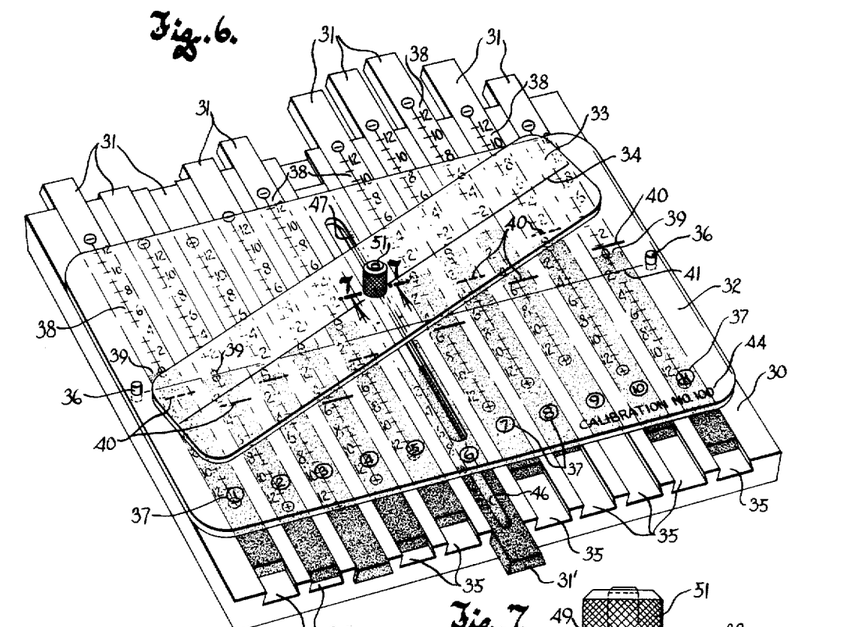
FIGURE 6 is a perspective view of one form of analogue computer which is adapted for the practice of the method of this invention.

The method of this invention lends itself to practice with the aid of an analogue computer, such as that shown in FIGURE 6, which greatly facilitates selection of a reference plane and the relation of all measurements to that reference plane.

In general the computer illustrated in FIGURE 6 comprises a flat base member 30, a plurality of elongated parallel scale members 31 mounted on the base member for lengthwise sliding motion, a transparent calibration plate 32 adapted to be secured to the base member, overlying the scale members, and an index plate 33 on which is delineated a straight line 34.

The base member is preferably a rectangular flat plate of plastic or the like, having parallel grooves 35 extending entirely across it and opening to its upper face, in which the scale members 31 are slidably mounted with their upper surfaces substantially flush with the upper surface of the base member. Near its end edges the base member has small studs 36 projecting above its top surface which are adapted to be received in closely fitting holes in the calibration plate 32 to releasably secure the latter to the base member, overlying the scale members 31.

Each scale member corresponds to one of the designated stations on a calibrated straightedge, and the calibration plate, which is preferably formed of transparent sheet plastic, may have a numeral or other indicium 37 delineated thereon, over each scale member, to denote the calibrated station represented by the scale member therebeneath. On the face of each scale member is delineated a scale 38 of uniformly spaced apart points, extending lengthwise in opposite directions from a medial reference point 39. For convenience in using the device the points on the scales may be numbered, With the reference point 39 designated as zero, and with points above the reference point designated as negative and those below it as positive. The scales on the several scale members are, of course, all uniform with one another.

In using the computer, the scale members 31 cooperate to provide an analogue of the surface profile of a plate along a line of measurements, or in another words correspond to the bars on the bar graphs of FIGURES 2, 3 and 4. Hence, the scale members, or, rather, the grooves 35 in which they slide, are laterally spaced from one another by uniform distances, assuming that the corresponding calibrated stations on the straightedge are uniformly spaced apart. If the calibration stations are non-uniformly spaced, the spacing of the scale members should of course be varied in corresponding ratio, so that the scale members will be capable of providing an accurate representation of the surface profile determined from measurements at the straightedge stations.

To eliminate the necessity for making arithmetical corrections of the "raw" readings of distances from the straightedge to the surface, in order to compensate such readings for the calibrated deviations of the straightedge, the calibration plate has a fiducial mark 40 delineated thereon for each scale member. Each fiducial mark is displaced from a straght line 41 that extends transversely across all of the scale members, the amount of such displacement being, of course, proportional to the calibrated deviation of the straightedge from flatness at the corresponding straightedge station.

If desired, the straight line 41 may be marked directly on the calibration plate, but it may be preferable in many cases to delineate it on a separate transparent zero correction plate 42 (FIGURE 8) which can have the same shape and size as the calibration plate and can be adapted for securement to the base member by means of the studs 36. The straight line 41' on the zero correction plate corresponds to a perfect straightedge, and therefore when a calibration plate is prepared the zero correction plate can be mounted on the base member, under the calibration plate, so that the straight line 41' can be used as a reference in determining the location of the fiducial marks 40 on the calibration plate. It will be noted that an individual calibration plate is required for each calibrated straightedge used with the computer, and it is therefore convenient to mark each calibration plate, as at 44, with the serial number of the straightedge for which it is calibrated.

As a line of measurements is taken from a calibrated straightedge to a surface plate undergoing inspection, the scale member 31 corresponding to each station on the straightedge is slid to a position in which the point thereon representing the "raw" measurement reading at that station is under the cooperating fiducial mark 40 on the calibration plate. Since the displacement of the fiducial marks from the straight line 41 automatically corrects for the calibrated deviations of the straightedge from true flatness, the reference ("zero") points 39 on the several scale members will be in such relationship to one another as to depict the true profile of the plate along the line of measurements, or in other words, the reference points will provide a bar graph, similar to that of FIGURE 2. To facilitate visual inspection of this bar graph, the lower half of each scale member may be colored differently from its upper half, or the reference points may be emphasized in some other suitable manner.

Figures 7, 8:
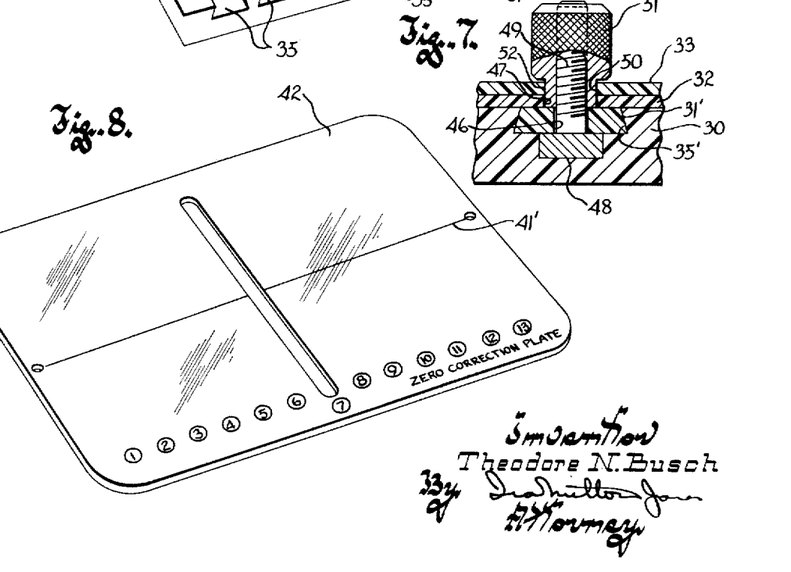
FIGURE 7 is a sectional view taken on the plane of the line 7—7 in FIGURE 6.
FIGURE 8 is a perspective view of a zero correction plate intended for use with the computer shown in FIGURE 6.

With the scale members set up to provide an analogue of the surface profile along the first diagonal, the index plate 33 can be used to facilitate the selection of a desired reference-plane-defining line and the tabulation of the profile elevations relative to that line. To this end the index plate is preferably formed of transparent plastic material, with the straight line 34 delineated thereon. It is long enough so that the line 34 can extend across all of the scale members, and it is mounted for edgewise sliding motion across the scale members, flatwise overlying the calibration plate 32. To provide for such mounting of the index plate, the central scale member 31' has a lengthwise extending slot 46 therein and the calibration plate 32 has an elongated slot 47 which substantially registers with said slot 46 in scale member 31'. An elongated, flat slider 48 endwise slidably mounted in the central groove 35' in the base member 30 beneath the slotted scale member 31', carries a threaded stud 49 which projects upwardly through the slots 46 and 47 and through a hole 50 in the index plate, the axis of which intersects the straight line 34 delineated thereon. A nut 51, threaded on the stud 49, has a lower cylindrical portion 52 which closely fits the hole 50 in the index plate to confine the latter to swinging motion about the axis of the stud 49 while permitting it to also have translatory motion in directions lengthwise of the slots 46 and 47 when the nut is loose. Hence, the index plate can be readily shifted about until the straight line 34 thereon is seen to have a position in which it is so related to the surface profile as to define a desirable reference plane. With the position of the first reference-plane-defining line thus determined, the surface elevations at each station relative to that selected reference plane line can then be read directly from the corresponding scale member, being represented by the point on the scale member which lies beneath the line 34 on the index plate.

Once the first reference-plane-defining line has been selected, the nut 51 is tightened to lock the index plate and the central scale member 31' against relative motion in directions lengthwise of said scale member, while leaving the index plate free to be swung about the axis of the stud 49. To provide for such releasable locking, the slot 47 in the calibration plate is somewhat wider than the slot 46 in the central scale member 31', and the lower cylindrical portion 52 of the nut 51 is narrow enough to extend through the slot 47 in the calibration plate but large enough in diameter to cooperate with the slide 48 in clampingly engaging the central scale member 31' when the nut is tightened.

It will be seen that this locking of the index plate to the central scale member 31' is analogous to plotting, on the profile graph of the measurements along the second diagonal, the point that defines the location of the first reference-plane-defining line with respect to that profile.

The values of measurements taken along the second diagonal are set into the scale members in the same manner as were the measurements taken along the first diagonal, and when all such values have been inserted into the computer the index plate 33 can be swung about the axis of the stud 49 until, by visual inspection, the line 34 is found to occupy the most favorable position for the profile along the second diagonal. Again, the elevation at each station relative to the reference plane thus defined can be read directly off of the scale member for that station, under the line 34 on the index plate.

When measurements are taken along grid lines parallel to the edges of the plate being inspected, the scale members are again moved to positions in which the relative locations of their reference points 39 portray the profile of the surface along the line of measurements, using the fiducial marks 40 on the calibration plate for setting in the "raw" measurement values. In this case, however, the index plate is unlocked from the central scale member 31' so that it can be disposed with its line 34 on bench mark points corresponding to points $Q_1$ and $Q_2$ in FIGURE 4. Again, true elevation values relative to the reference plane can then be read off of each scale member, at the line 34 on the index member.

It will be apparent that the computer greatly facilitates the tabulation of elevations along each grid line, because it permits "raw" readings to be inserted directly into the instrument, without the need for arithmetical correction to compensate for straightedge deviations, and because it eliminates the need for laborious plotting of a graph on paper and the actual measurement of elevation values on the graph.

In some cases it may be found that the reference plane first selected is not desirable or that some other reference plane may be more suitable. The computer of this invention provides a ready means of changing the reference plane at any point in the inspection procedure after the original reference plane has been established.

The conversion to a new reference plane can be started with any diagonal or grid line. For this purpose, the calibration plate is replaced with the zero correction plate 42, which has only a straight line 41' transverse to the scale members delineated thereon. Using the line 41' as a read-in mark or fiducial line, the scale members are set to their corresponding station elevations on the selected line of measurements.

The values thus set into the scale members are the true elevations relative to the originally selected reference plane, and hence the relative positions of the reference points 39 on the several scale members are such as to reconstruct a representation of the true surface profile along that line. Now the index plate is moved to bring the line 34 thereon to the position with respect to this profile at which it represents the new desired reference-plane-defining line, and the value of the surface elevation for each station, relative to the new reference plane, is read from the straight line 34 on the index plate and tabulated.

Next a line of measurements intersecting that just used it set up on the scale members, again using the zero correction line 41' as a read-in line for the elevations relative to the original reference plane. On the profile thus constructed the straight line 34 on the index plate is swung about a point on the station at which the selected measurement lines intersect, which point corresponds to the distance from the surface of the first new reference-plane-defining line. When the desired new reference plane is thus found, station elevations relative to it are read off of the scale members, at the index plate line 34. The subsequent procedures will be the usual ones for determining elevations along each line of measurements relative to a selected reference plane, using bench mark points which in each case correspond to the new reference plane.

From the foregoing description, taken together with the accompanying drawings, it will be apparent that this invention provides a method of selecting a reference plane for use in checking a surface plate by means of a straightedge, which method allows the operator a wide freedom of choice in such selection and facilitates the selection of a practical gaging reference plane which reveals the features of a particular surface with a minimum of confusion. It will also be apparent that the invention provides a simple and inexpensive analogue computer for the practice of the method, whereby correction is automatically made for the calibrated deviations of a straightedge from true straightness, and whereby the selection of a practical gaging reference plane is greatly facilitated, the reading of elevation values in relation to the surface plane is simplified and expedited, and a change of reference plane is made feasible. Thus the method and apparatus of this invention greatly facilitate and expedite the inspection of a surface plate by means of a calibrated straightedge and at the same time improve the accuracy of the inspection procedure by minimizing the chances for mechanical discrepancies in the measuring apparatus and for errors in measurement and computation.

What is claimed as my invention is:

1. A device for use in checking the flatness of the surface of a surface plate by means of a calibrated straightedge mounted above said surface in different positions, extending along predetermined lines across said surface, and which device facilitates selection and use of a reference plane to which all measurements of distances between said surface and the calibrated edge of the straightedge can be related in order to provide a quantitative appraisal of the variation of the surface from true flatness, said device comprising: a supporting member; a group of scale members, each adapted to correspond to a measurement taken at one of the calibrated stations on a straightedge and each having delineated thereon a scale of spaced apart points extending in opposite directions from a medial reference point, the scales on the several scale members being uniform with one another and the scale members being mounted on the supporting member for independent motion in the directions in which their scales extend, with the members disposed with their scales extending in the same directions and laterally adjacent to one another; means on the supporting member defining a set of fiducial marks with which the scales on the scale members are adapted to cooperate so that the scale members can be moved to bring their reference points to positions relative to one another corresponding to the relative true elevations of the surface plate surface at stations on a line thereacross at which measurements have been taken, in which positions of the scale members their reference points constitute a graph representing the profile of said surface along said line; an index member having means thereon cooperable with the scales on the scale member to represent a straight line extending transversely to the scales; and means cooperating with the scale members and the index member to confine the scale members and the index member to motion relative to one another in directions in which the scales on the scale members extend, and without disruption of the profile representation defined by the reference points on the scale members, so as to permit selection by inspection of a reference plane defining straight line that best suits the profile represented by the reference points on the scale members.

2. The device of claim 1, further characterized by means for releasably locking the index member and one of the scale members against relative motion in directions along the scale on said one scale member, but permitting relative motion between the index member and the other scale members without disruption of the profile representation defined by the reference points on the scale members.

3. The device of claim 1, further characterized by the fact that said fiducial marks on the supporting member are displaced from a straight line transverse to the scales on the scale members by distances corresponding to the calibrated deviations of a straightedge from true straightness at predetermined spaced apart stations, so that the true relative elevations of points on the surface to which measurements were taken is represented by the relative positions of the reference points on the scales despite the fact that the scale members are positioned in accordance with uncorrected measurement readings.

4. Apparatus for use in checking the surface of a surface plate by means of measurements of distances between said surface and a straightedge mounted thereabove, which apparatus facilitates selection of a practical gaging reference plane and the relation to said plane of measurements taken from the straightedge to the surface at stations along each of several predetermined lines across said surface, so that the variations of the surface from true flatness can be quantitatively ascertained, said apparatus comprising: a supporting member; means movably mounted on said supporting member for producing an analogue of the profile of a surface being measured, taken along a line of measurements, said means comprising a plurality of scale members, each adapted to provide an analogue to a measurement taken at one of the stations along a line of measurements, and each having a scale of spaced apart points delineated thereon extending in opposite directions from a medial reference point, the scales on said members being uniform with one another, and said members being movable independently of one another in the directions in which their scales extend and being mounted in uniformly spaced apart laterally adjacent relationship; means on the supporting member providing a fiducial point cooperable with the scale on each scale member to enable movement of the scale members to positions at which the medial reference points on their scales are so related to one another as to graphically represent the profile of a surface along a line on which measurements have been taken; and means providing an analogue of a straight line extending along the representation of the surface profile provided by the scale members, transversely to the scales on them, and shiftable along the scales on them, so as to permit the selection by inspection of a reference plane defining line that best suits the profile represented by the reference points on the scale members.

5. A device for use in checking the flatness of the surface of a surface plate by means of a calibrated straightedge mounted above said surface in different positions, extending along predetermined lines across said surface, and which device facilitates selection and use of a reference plane to which all measurements of distances between said surface and the calibrated edge of the straightedge can be related in order to provide a quantitative appraisal of the variation of the surface from true flatness, said device comprising: a base plate; a group of elongated scale members mounted on the base plate in spaced apart parallel relationship for independent endwise sliding motion relative to the base plate, each scale member being marked with a scale of uniformly spaced apart points extending lengthwise in opposite directions from a medial reference point, the scales on the several scale members of the group being uniform with one another; means on the base plate, fixed with respect to the scale members, defining fiducial marks with which points on the scales on the several scale members are adapted to be aligned, and which marks are displaced from a straight line transverse to the lengths of the scale members by distances corresponding to calibrated departures of a particular straightedge from true straightness at defined stations along the length of the straightedge; and index member long enough to span the group of scale members transversely to their lengths and having a lengthwise extending straight line delineated thereon; and means cooperable with one scale member of the group and with the index member for releasably locking the index member at any desired position of adjustment along the length of said scale member and constraining the index member, when so locked, to rotational motion in a plane parallel to the surfaces of the scale members and about an axis which intersects the straight line delineated on the index member.

6. A device for use in checking the flatness of the surface of a surface plate by means of a calibrated straightedge mounted above said surface in different positions, extending along predetermined lines across said surface, and which device facilitates selection and use of a reference plane to which all measurements of distances between said surface and the calibrated edge of the straightedge can be related in order to provide a quantitative appraisal of the variation of the surface from true flatness, said device comprising: a plurality of elongated scale members, each marked with a scale of uniformly spaced apart points extending lengthwise of the scale member in opposite directions from a medial reference point, the scales on the several scale members being uniform with one another; a base member on which the scale members are mounted for independent lengthwise sliding motion and on which they are disposed parallel to one another, laterally spaced apart by distances corresponding to the distances between calibrated stations on a straightedge; means on the base member defining fixed fiducial marks with which points on the scales on the several scale members are adapted to be aligned to dispose the reference points on the scale members in positions relative to one another that corresponds to the relative true elevations of points on a surface to which measurements were taken, along the line of such measurements, so that the reference points cooperate in graphically depicting the profile of said surface along said line; an index member long enough to span the group of scale members transversely to their lengths and having a lengthwise extending straight line delineated thereon cooperable with the scales on the scale members to designate a point on each scale; and means constraining the index member to motion in directions lengthwise of the scale members.

7. The device of claim 6, further characterized by the fact that said fixed fiducial marks are displaced lengthwise of the scale members from a straight line transverse to the lengths of the scale members by distances corresponding to calibrated departures of a straightedge from true straightness at defined stations along its length, so that when a scale member is moved to a position at which the point on its scale opposite the fiducial mark corresponds to the value of the uncorrected measurement of the distance from the surface to the corresponding station on said straightedge, the corrected value of the measurement can be read on the scale at said straight line.

8. A device for use in checking the flatness of the surface of a surface plate by means of a calibrated straightedge mounted above said surface in different positions, extending along predetermined lines across said surface, and which device facilitates selection and use of a reference plane to which all measurements of distances between said surface and the calibrated edge of the straightedge can be related in order to provide a quantitative appraisal of the variation of the surface from true flatness, said device comprising: a base plate having a flat upper surface, and a plurality of elongated, parallel, spaced apart grooves each opening to said upper surface and extending entirely across the base plate; an elongated scale member lengthwise slidably mounted in each of said grooves, each of said scale members having delineated thereon a scale of uniformly spaced apart points extending lengthwise of the scale member in opposite directions from a medial reference point, the scales on the several scale members being uniform with one another, and one scale member having a lengthwise extending slot therein; studs projecting upwardly from the upper surface of the base plate at fixed locations thereon; a transparent calibration plate having closely fitting holes in which said studs are adapted to be engaged to secure the calibration plate to the base plate, flatwise overlying the scale members without interfering with their sliding motion, said calibration plate having fiducial marks thereon with which points on the scale on each scale member are adapted to be aligned and which fiducial marks are displaced from a straight line transverse to the lengths of the scale members by distances corresponding to calibrated departures of a straightedge from true straightness at defined stations along its length, said calibration plate also having a slot therein which registers with said slot in said one scale member; a transparent index plate long enough to extend across all of the scale members transversely to their lengths and having a straight lengthwise extending line delineated thereon and a hole therethrough, the axis of which intersects said straight line; a shaft projecting upwardly through said slots in said one scale member and the calibration plate and through said hole in the index plate; and cooperating abutment means on opposite end portions of the shaft, one underlying said one scale member and one overlying the index plate, one of said abutment means having a screw threaded connection with the shaft so that the index plate can be releasably locked against movement lengthwise relative to said one scale member and thus constrained to rotational movement relative to said scale member about the axis of said hole in the index plate.

9. A device for use in checking the flatness of the surface of a surface plate by means of a calibrated straightedge mounted above said surface in different positions, extending along predetermined lines across said surface, and which device facilitates selection and use of a reference plane to which all measurements of distances between said surface and the calibrated edge of the straightedge can be related in order to provide a quantitative appraisal of the variation of the surface from true flatness, said device comprising: a base plate; a group of elongated scale members mounted on the base plate in spaced apart parallel relationship, for independent endwise sliding motion relative to the base plate, each of said scale members having delineated thereon a scale of uniformly spaced apart points extending in opposite directions lengthwise of the scale member from a medial reference point, the scales on the several scale members of the group being uniform with one another and one scale member of the group having a lengthwise extending slot therein; a transparent calibration plate; cooperating means on the base plate and the calibration plate for detachably fixing the latter to the base plate, flatwise overlying the scale members in a position permitting the scale members to be moved beneath it, said calibration plate having fiducial marks thereon with which points on the scale on each scale member are adapted to be aligned, which fiducial marks are displaced from a straight line transverse to the lengths of the scale members by distances corresponding to calibrated departures of a straightedge from true straightness as defined stations along its length, said calibration plate also having a slot which registers with the slot in said one scale member; a transparent index plate long enough to span the group of scale members transversely to their lengths and having a hole therethrough, the axis of which lies on said straight line; and means including a screw extending through said hole in the index plate, said slot in the calibration plate and the slot in said one scale member for securing the index plate flatwise over the calibration plate, with the index plate rotatable about the screw, said last named means providing for adjustably locking the screw in any desired position along said slot in the one scale member, to hold the index plate against motion lengthwise relative to said one scale member.

References Cited in the file of this patent

UNITED STATES PATENTS

| | | |
|---|---|---|
| 2,550,004 | Doll | Apr. 24, 1951 |
| 2,605,961 | Glasser | Aug. 5, 1952 |
| 2,721,031 | Mathieu | Oct. 18, 1955 |
| 2,947,083 | Rahn | Aug. 2, 1960 |

UNITED STATES PATENT OFFICE
CERTIFICATE OF CORRECTION

Patent No. 3,087,246                                          April 30, 1963

Theodore N. Busch

It is hereby certified that error appears in the above numbered patent requiring correction and that the said Letters Patent should read as corrected below.

Column 7, line 44, for "$M_2$" read -- $N_2$ --; column 11, line 18, for "it" read -- is --.

Signed and sealed this 12th day of November 1963.

(SEAL)
Attest:
ERNEST W. SWIDER                                      EDWIN L. REYNOLDS Attesting Officer                                  Acting Commissioner of Patents